United States Patent [19]

Emain

[11] 4,428,094
[45] Jan. 31, 1984

[54] HINGE ELEMENTS FOR SPECTACLES COMPRISING A FRICTION RING

[75] Inventor: Jean Emain, Saint Claude, France

[73] Assignee: S.A. Vve Henry Chevassus, Morez, France

[21] Appl. No.: 313,317

[22] Filed: Oct. 20, 1981

[30] Foreign Application Priority Data

Oct. 28, 1980 [FR] France ................................ 80 23029

[51] Int. Cl.³ ............................................. G02C 5/22
[52] U.S. Cl. ..................................... 16/228; 16/342; 351/153
[58] Field of Search ................. 16/340, 342, 228, 337; 351/113, 153

[56] References Cited

U.S. PATENT DOCUMENTS

| | | |
|---|---|---|
| 2,412,120 | 12/1946 | Bouchard . |
| 2,828,668 | 4/1958 | DeAngelis ....................... 16/228 X |
| 2,939,168 | 6/1960 | Ferron ................................. 16/228 |
| 3,042,961 | 7/1962 | Tieri ..................................... 16/228 |
| 3,427,681 | 2/1969 | Smith, Jr. ....................... 351/153 X |
| 3,671,111 | 6/1972 | Okner . |

*Primary Examiner*—Mark Rosenbaum
*Attorney, Agent, or Firm*—Fitzpatrick, Cella, Harper & Scinto

[57] ABSTRACT

The invention relates to an improvement in hinge elements for spectacles, constituted by three elements, of which the first two elements, respectively fast with the front of the spectacle frame and with one of the sides thereof, comprise a male tenon element engaged in a female mortise element, said elements being connected together by a third element constituted by a hinge pin. One of the first two elements of the hinge presents a housing in which is disposed an elastic member which exerts an axially directed braking force acting between the first two elements of the hinge. The invention is used for making hinge elements for spectacles.

18 Claims, 14 Drawing Figures

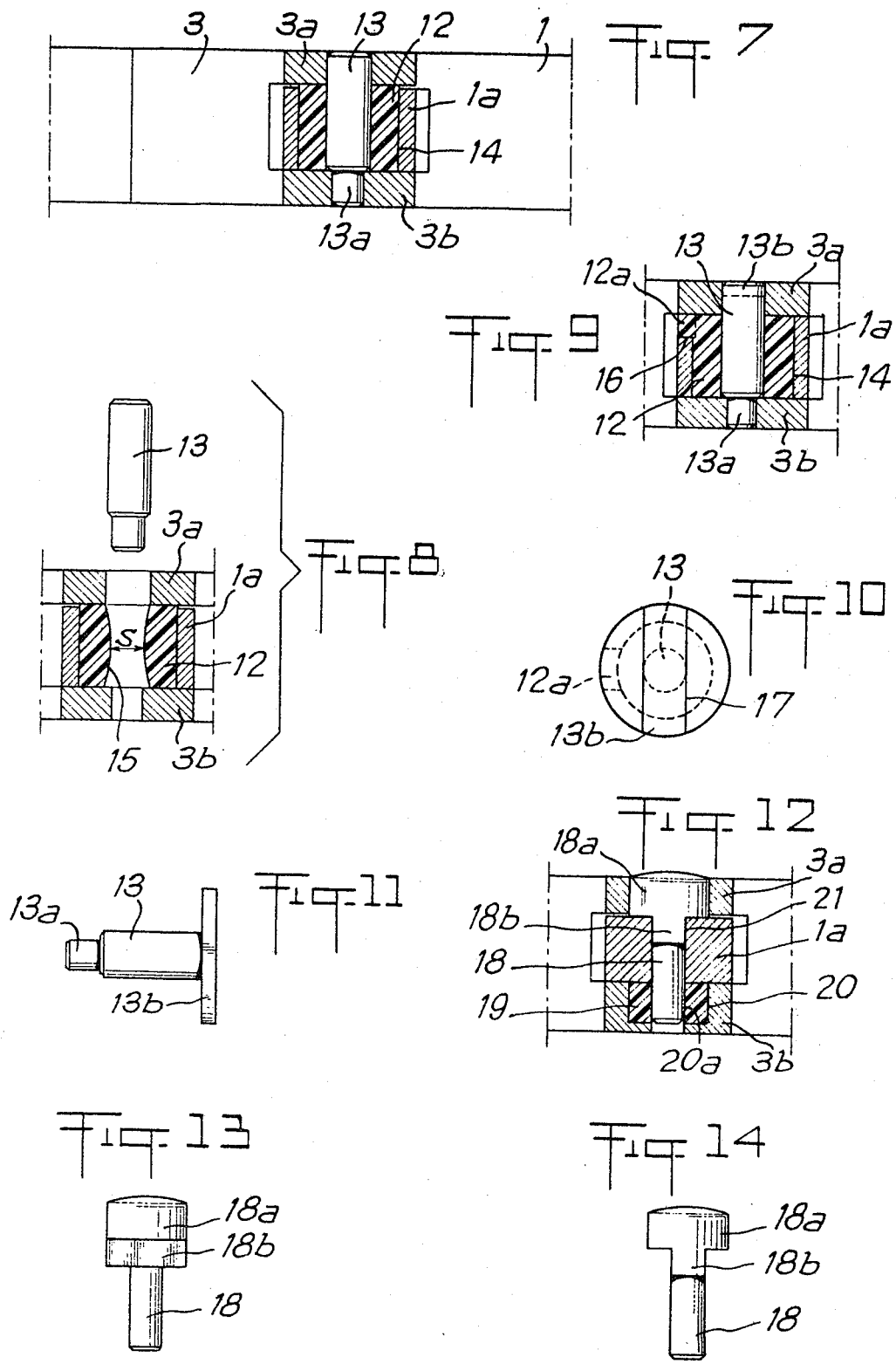

HINGE ELEMENTS FOR SPECTACLES COMPRISING A FRICTION RING

The present invention relates to an improvement in hinge elements for spectacles.

Conventional hinge elements which are known at present comprise three elements, viz. a male tenon element pivoted in a female mortise element by means of a third element constituted by a hinge pin.

Depending on manufacture, if the male tenon element is fast with one of the sides of the spectacle frame, the female mortise element is fast with the front of the frame bearing the lenses, or vice versa.

The hinge pin comprises at one of its ends a milled head allowing adjustment, by means of a screwdriver, of the pin of which the other end has a threaded part screwed in a tapped hole provided on one of the elements of the hinge. This tightening of the torque manoeuvring the hinge and consequently the side fastened on one of the elements, is obtained by screwing the hinge pin which creates a mechanical braking stress, by friction on the faces of the tenon elements of the hinge.

Different hinge devices are known and have been the subject matter of patents, in which an additional element is provided in the hinge element of spectacles, whose purpose is to avoid the seizing which is produced on contact of the two tenon elements made of the same metal and without axial stress, during the opening and closing movement of the sides of spectacles. The purpose of the improved hinge element for spectacles according to the invention is to remedy this drawback and it presents numerous advantages over the presently known devices.

According to the present invention, the male tenon of one of the first two elements of the hinge element presents a cylindrical bore in which is disposed a removable, compressible friction ring made of semi-elastic plastics material which exerts an axially directed braking force acting by contact on the two opposite inner faces of the arms of the female element, said friction ring, in stressed state, having between its two opposite faces a height at least equal to the thickness of the male tenon.

The friction ring is very simple, easy to manufacture in series by moulding and it is removable in order to enable it to be rapidly removed and replaced, if necessary, durimg the welding operations or to allow a male or female element of the hinge to be deposited hot on the front or the side of spectacles.

Due to its tubular form, the ring may be housed in a bore of a tenon element of a hinge of conventional type without requiring to this end an additional machining operation concerning the bore and consequently without increasing the costs of manufacture.

The ring which is mounted and positioned without stress in a tenon element of the hinge may perform two functions.

The first function consists in a braking in axial direction by contact of the ring with the other tenon element, during the opening and closing movement of the side of the spectacle frame. The second function consists in a radial tightening which is produced by the contact of the ring with the smooth body of the hinge pin which may comprise a shouldered or non-shouldered threaded part.

The device according to the invention may be applicable in various ways. According to a first application, the ring is mounted in combination with a conventional hinge pin presenting a threaded part.

In this case, the braking torque is obtained as required by effecting a fractional screwing of the hinge pin.

The deformable ring also exerts a radial tightening on the hinge pin thus preventing it from unscrewing and maintaining constant in time the braking torque for opening and closing the side of the spectacles.

According to a second application, the hinge pin presenting a shouldered threaded part is blocked on an arm of the female mortise element. The braking torque is predetermined, taking into account the tolerances of the elements constituting the hinge.

According to a third application, the hinge pin presents a smooth, non-threaded body. The ring presents tolerances such that it is stressed axially and radially on assembly, and a braking results between the two tenon elements, and an axial positioning of the hinge pin.

In this embodiment, the arms of the female mortise are of larger section than in the preceding modes of application to support and maintain the axial thrust of the friction ring.

The invention will be more readily understood on reading the following description with reference to the accompanying drawings, in which:

FIG. 7 is a view in elevation and in section of a variant embodiment of the hinge element shown in FIG. 6.

FIG. 8 is a view in elevation and in section of the hinge element shown in FIG. 7 before assembly of the hinge pin.

FIG. 9 is a view in elevation and in section of a hinge element comprising a semi-elastic ring positioned on the female mortise element with hinge pin with head having a flat portion positioned on an arm of the female element.

FIG. 10 is a plan view from above of the hinge element shown in FIG. 9.

FIG. 11 is a view in elevation of a hinge pin with head having flat portion.

FIG. 12 is a view in elevation and in section of an embodiment of a hinge in which the semi-elastic ring is disposed in one of the arms of the female mortise with hinge pin with head having flat portion positioned on the male tenon element, and FIGS. 13 and 14 are views in elevation of a pin of which the head has a flat portion engaged in the male tenon of the hinge element shown in FIG. 12.

Figure 1:
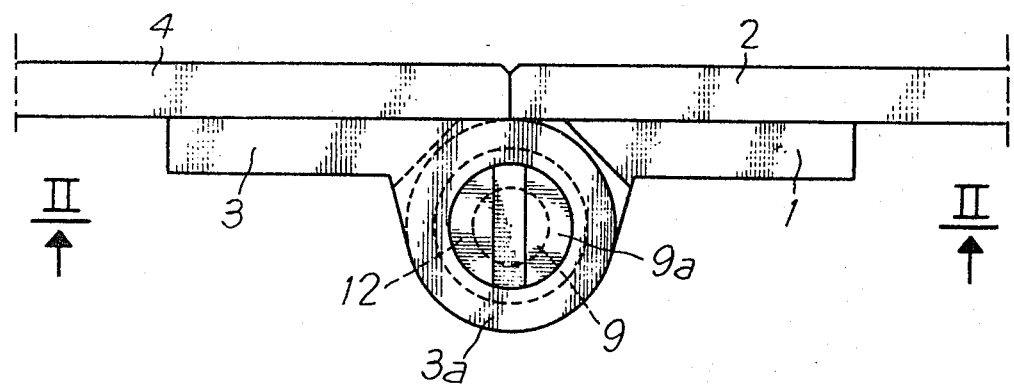
FIG. 1 is a plan view of an embodiment of a hinge element for spectacles, comprising a friction ring made of semi-elastic material.
Figure 2:
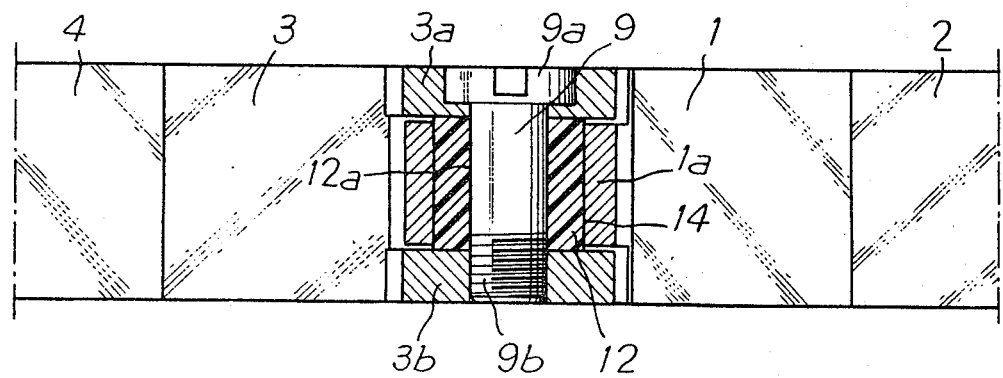
FIG. 2 is a view in section of the hinge along line II—II of FIG. 1.

Referring now to the drawings, FIGS. 1 and 2 show a hinge element for spectacles, constituted by an element 1 with male tenon 1a, said element being fixed, particularly by rivets or by welding, on one of the sides 2 of the pair of spectacles. The male tenon 1a is engaged between the arms 3a, 3b of a female mortise element fast with an element 3 fixed by means of rivets or by welding on the front face 4 of the spectacle frame.

The elements 1 and 3 are connected by a hinge pin constituted by a screw 9 of which the milled head 9a is mounted in a bore in one of the arms 3a of the female mortise and the other end of the screw 9 has a threaded part 9b which is screwed in a tapped hole in the other arm 3b. This screw is mounted freely and does not comprise any shoulder, as is the case in FIG. 4 described hereinafter. Around the screw 9 is mounted a friction ring 12 engaged in a cylindrical bore 14 made in the male tenon 1a. The removable compressible friction ring 12 made of semi-elastic plastics material exerts an axially directed braking force acting by contact on the two opposite inner faces of the arms 3a, 3b of the female element 3, said friction ring 12, in the stressed state, presenting between its two opposite faces a height at least equal to the thickness of the male tenon 1a. The friction ring 12 comprises a bore 12a in which is engaged the shank of the screw 9 and of which at least one part presents, when the ring 12 is in the free, non-stressed state, a section smaller than that of said shank of the screw 9 which, when it is engaged in the bore of the ring, produces an expansion of said ring 12 thus exerting a radial braking force on the cylindrical part of the shank of the screw 9 thus ensuring an axial positioning of the pin or of the screw 9.

Figure 3:
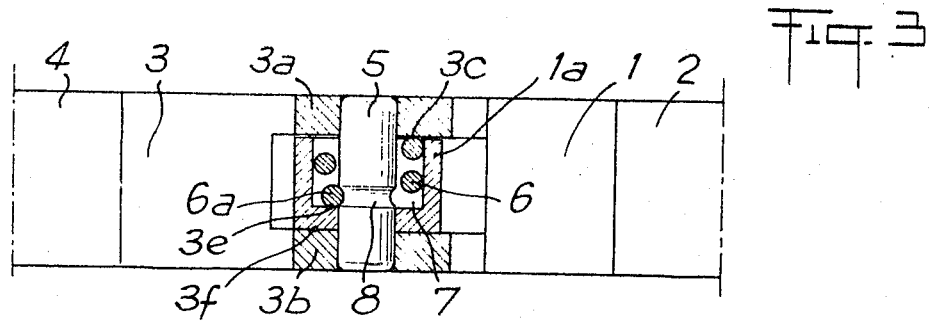
FIG. 3 is a view in elevation and in longitudinal section of another embodiment of a hinge element comprising a coil spring.

In the embodiment of the hinge shown in FIG. 3, the elements 1 and 3 are connected by a pin 5 around which is disposed a coil spring 6 engaged in a housing 7 made in the male tenon 1a.

The spring 6 exerts a braking force on the male tenon element 1a on which the side 2 is fastened, said force being directed axially between the arms of the female mortise 3a, 3b, the prestressed spring 6 housed in the male tenon 1a abutting on a face 3c of the female element 3a, on a face 3e of the housing 7 and pushing at 3f the male tenon element 1a on the arm 3b of the female element to obtain a determined maneuvering torque, upon opening and closure of the side of the spectacle frame.

The hinge pin 5 presents a constant section over the whole length and one of the turns 6a, which is located on a primitive radius lower than that of the other turn 6b, is elastically engaged in tightening position in a circular groove 8 made on the hinge pin 5. In this way, an axial positioning of the pin 5 is obtained, which is maintained in place in the bores of the arms 3a and 3b of the female mortise element.

Figure 4:
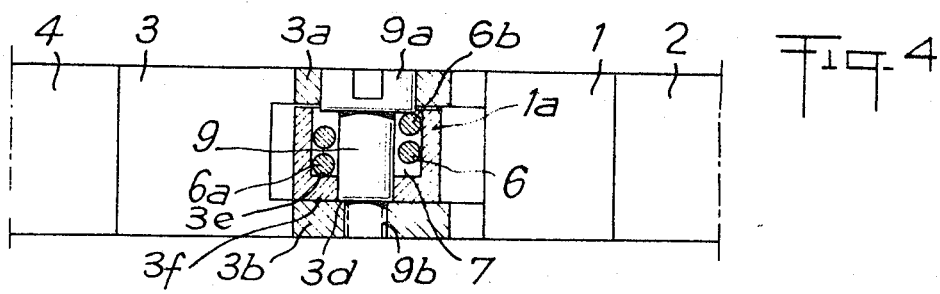
FIG. 4 is a view in elevation and in longitudinal section of another embodiment of a hinge element provided with a shouldered hinge pin.

FIG. 4 shows another embodiment in which a screw 9 is used as hinge pin whose milled head 9a is mounted in a bore in one of the arms 3a of the female mortise element and the other end of the screw 9 presents a threaded part 9b which is screwed in a tapped hole in the other arm 3b. The screw 9 is blocked by contact of its cylindrical body with the inner face 3d of the female mortise element.

The coil spring 6 is in abutment by its two end turns 6a, 6b respectively at 3e on the bottom of the housing 7 of the male tenon and against the head 9a of the screw 9. The spring 6 pushes at 3f the male tenon element 1a on the arm 3b of the female element.

This spring exerts an axially directed braking force between the arms of the female mortise element.

Figure 5:
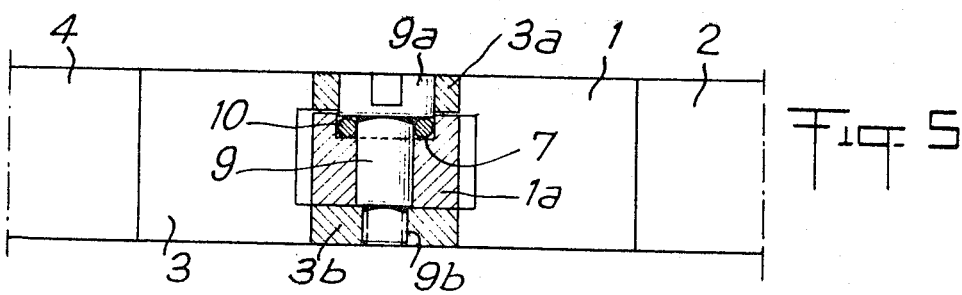
FIG. 5 is a view in elevation and in section of another embodiment of a hinge element comprising an elastic ring.

In the embodiment shown in FIG. 5, the coil spring 6 is replaced by a toric ring 10 made of elastic material disposed in a housing 7 in the male tenon 1a. The ring 10 in abutment against the bottom of the housing 7 and against the head 9a of the screw, exerts an axially directed braking force between one of the arms 3b of the female mortise element and the male tenon 1a.

Figure 6:
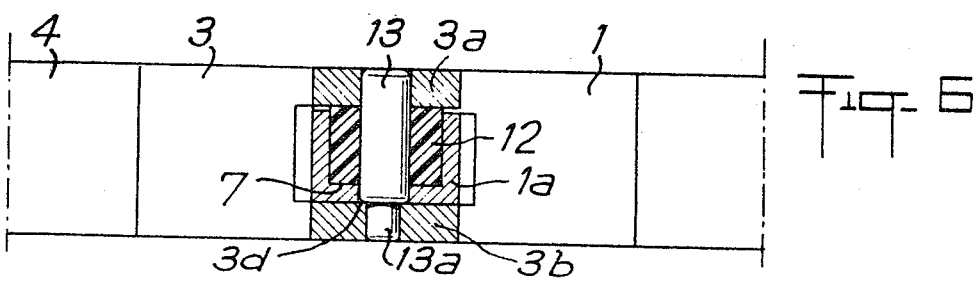
FIG. 6 is a view in elevation and in section of another embodiment of a hinge element comprising a ring made of semi-elastic material.

FIG. 6 shows another embodiment of a hinge in which the elastic member is constituted by a ring 12 made of semi-elastic plastics material disposed in the housing 7 of the male tenon 1a.

This arrangement ensures an axial braking between the male and female tenon elements, and a tightening on the body of the hinge pin 13 of which the axial positioning is ensured.

The pin 13 which is of constant section except in the part 13a of smallest section engaged in a bore in the arm 3b of the female mortise element, is engaged in the semi-elastic ring 12 which comprises a bore of which at least one part presents a section smaller than that of the pin 13 when the ring is in free state.

The two ends of the pin 13 are mounted to pivot in the arms 3a and 3b of the female mortise element and the part 13a of reduced section enables the pin to abut by a shoulder against the upper face 3d of the arm 3b of the female mortise element.

FIG. 7 shows a variant embodiment in which the male tenon 1a presents, not a closed housing, but a bore 14 opening at its two ends, so that the semi-elastic ring 12 is in contact with the two arms 3a, 3b of the female mortise element.

Before pin 13 is mounted in the ring 12 in the free state, the bore 15 presents curved walls defining a minimum section S in the central part, so that, upon engagement of pin 13 in bore 15, the ring is compressed radially and axially in the housing of the male tenon, the pin 13 is thus maintained tightened, and a braking force is exerted between the two arms 3a, 3b of the female mortise element.

FIGS. 9, 10 and 11 show a variant embodiment of the hinge in which the semi-elastic ring 12 comprises a radial tenon 12a engaged in a housing 16 in the male tenon 1a which is thus made fast with the ring 12. The hinge pin 13 comprises a head having a flat portion 13b engaged in a housing 17 made in the arm 3a of the female mortise. The other end 13a of the pin is engaged in the arm 3b of the female mortise.

FIGS. 12, 13 and 14 show another embodiment of the hinge, in which a ring 19 made of semi-elastic plastics material is disposed in a housing 20 in an arm 3b of the female mortise element, said ring having a bore 20a in which is engaged, with prestressed force, one of the ends of a hinge pin 18 of which the head 18a is mounted to pivot in the other arm 3a of the female tenon. Beneath the head 18a a flat portion 18b is provided on the pin 18 by which the head is rendered fast with the male tenon element 1a which presents a milled housing 21 in which the flat portion of the head is engaged.

Various modifications may, of course, be made by the man skilled in the art to the embodiments which have just been described, without departing from the scope of the invention.

What is claimed is:

1. A hinge for use with spectacles comprising a female mortise element having two arms defining opposite inner faces, a male tenon element engaged between the opposed inner faces of said two arms, and a third element constituted by a hinge pin for connecting said female mortise element and male tenon element, wherein one of the first two elements of the hinge is formed with a cylindrical bore in which is disposed a removable compressible friction ring made of semi-elastic plastics material for accepting said hinge pin when said hinge pin is positioned to connect said female mortise element and male tenon elements, and for exerting an axially directed braking force acting on the two opposite inner faces of the arms of the female mortise element, said friction ring, in the stressed state, presenting between its two opposite faces, a height approximately equal to the thickness of the bore within which it is disposed.

2. A hinge according to claim 1, wherein said friction ring is formed with a bore, said hinge pin extending through said bore, said ring presenting, when in the free, non-stressed state, a section smaller than that of said hinge pin, said hinge pin, when it is engaged in the bore of the ring, producing an expansion of said ring the outer diameter of which abuts against the bore of the housing of the male tenon element, said ring exerting a radial braking force on the hinge pin whereby an axial positioning of said pin is ensured.

3. A hinge according to claim 2, wherein the hinge pin includes a part threadedly engaging one arm of said female mortise element whereby said pin is positioned axially by the ring, and prevents unscrewing of the pin from said one arm of the female mortise element.

4. A hinge according to claims 1 or 3, wherein one of the first two elements presents a cylindrical bored housing with a flat bottom, in which said compressible elastic friction ring is disposed, a face of said ring being in axial contact with the inner face of an arm of said female mortise element, the friction ring, when disposed in said housing in the free, non-stressed state, presenting a height approximately equal to the depth of said housing.

5. A hinge according to claim 4, wherein said compressible elastic friction ring is in axial contact with the inner face of the head of said hinge pin.

6. A hinge according to claim 5, wherein one of said arms of said female mortise element is formed with an internal housing and said ring is mounted in said internal housing.

7. A hinge according to claim 6, wherein said hinge pin is formed with a head pivotally mounted in an arm of said female mortise element, the other end of said pin being engaged, with prestressed force, in a bore formed in said ring and, beneath the head, a flat portion is provided on the pin which is engaged in a milled housing formed in said male tenon element.

8. A hinge according to claim 5, wherein said friction ring is mounted to slide in the bore of said male tenon element.

9. A hinge according to claim 4, wherein said compressible elastic friction member is in axial contact with a face of the male tenon element.

10. A hinge according to claim 9, wherein said friction ring is mounted to slide in the bore of said male tenon element.

11. A hinge according to claim 9, wherein said hinge pin is formed with a head pivotally mounted in an arm of said female mortise element, the other end of said pin being engaged, with prestressed force, in a bore formed in said ring and, beneath the head, a flat portion is provided on the pin which is engaged in a milled housing formed in said male tenon element.

12. A hinge according to claim 3, wherein said friction ring is mounted to slide in the bore of said male tenon element.

13. A hinge according to claim 4, wherein said friction ring is mounted to slide in the bore of said male tenon element.

14. A hinge according to claims 1 or 2, wherein the height of the friction ring, in the free, non-stressed state, is at least equal to the distance separating the two inner faces of the arms of the female mortise element.

15. A hinge according to claim 14, wherein said friction ring is mounted to slide in the bore of said male tenon element.

16. A hinge according to claim 1, wherein said friction ring includes at least one radial tenon and said male tenon element is formed with a radial housing, said radial tenon being disposed in said radial housing.

17. A hinge according to claim 1, wherein said hinge pin is formed with a head presenting a flat portion and one arm of said female mortise element is formed with a recess, said head being disposed in said recess.

18. A hinge according to claim 1, wherein said hinge pin is formed with a head pivotally mounted in an arm of said female mortise element the other end of said pin being engaged, with prestressed force, in a bore formed in said ring and, beneath the head, a flat portion is provided on the pin which is engaged in a milled housing formed in said male tenon element.

* * * * *